United States Patent Office.

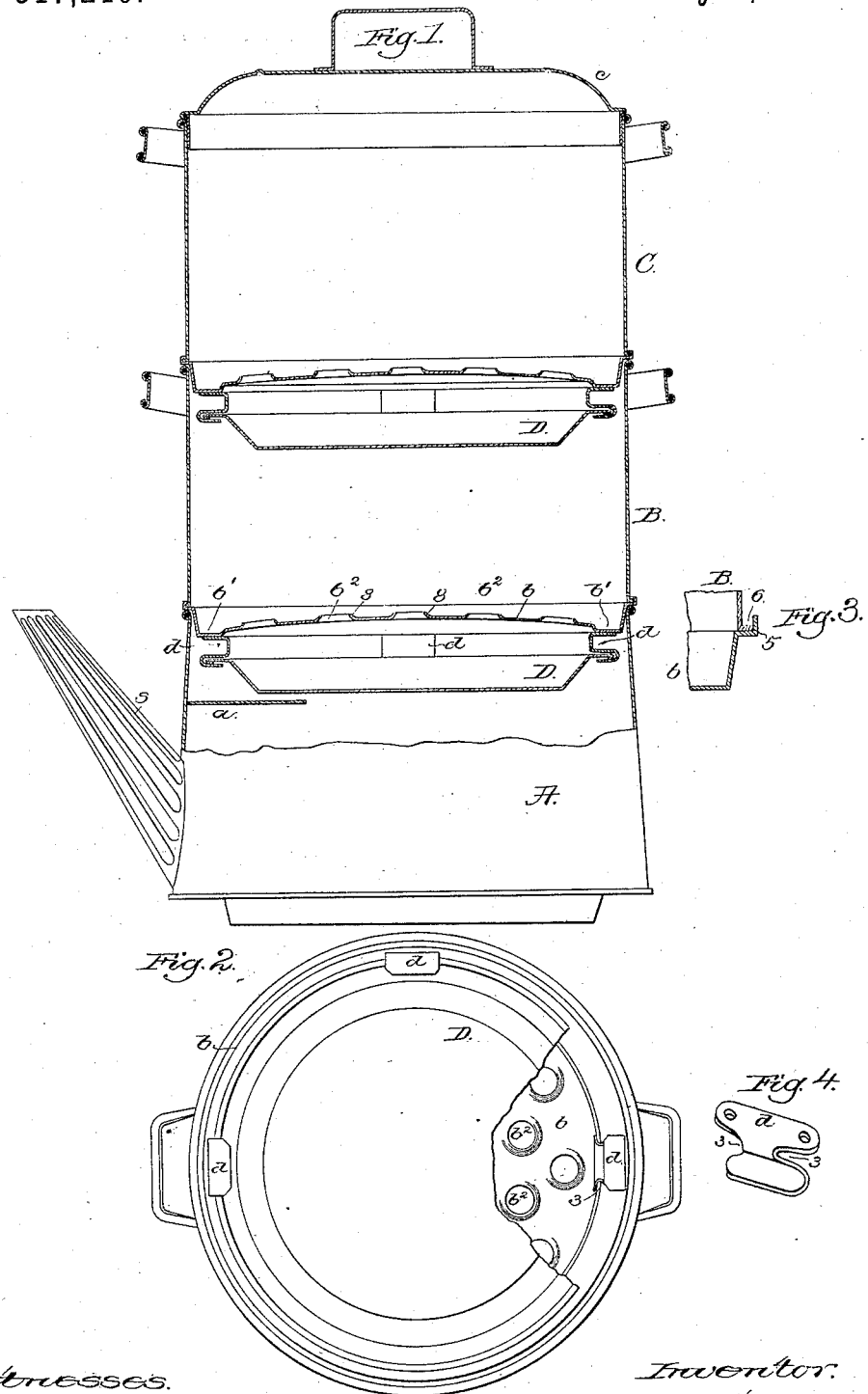

GEORGE F. SEAVEY, OF BOSTON, MASSACHUSETTS.

CULINARY STEAMER.

SPECIFICATION forming part of Letters Patent No. 317,219, dated May 5, 1885.

Application filed February 11, 1884. (No model.)

*To all whom it may concern:*

Be it known that I, GEORGE F. SEAVEY, of Boston, county of Suffolk, and State of Massachusetts, have invented an Improvement in Culinary Steamers, of which the following description, in connection with the accompanying drawings, is a specification, like letters on the drawings representing like parts.

This invention relates to that class of culinary steamers which consist, usually, of a kettle and one or more superimposed steaming-vessels having perforated bottoms, through which the steam generated in the kettle has ready access to all the said vessels.

Heretofore in the use of culinary steamers of the class mentioned the water of condensation and the fluids exuding from the meats or vegetables during the process of cooking are permitted to pass or drain from an upper to a lower vessel, and thence into the kettle, whereby the water in the kettle is not only rendered unfit to be used in the making of tea or coffee, or for other purposes, but also the meats or vegetables in the lower of a nest of vessels become impregnated with the fluids or juices of the articles of food that may be contained in the upper vessel.

The object of my invention is to avoid these two defects and to provide means to catch and retain the fluids of any one or each one of a nest of steamers supported upon a kettle.

To this end my invention consists, primarily, in a culinary steamer composed of a kettle or steam-generator and one or more cooking or steaming vessels provided with perforated bottoms, and having means to catch and retain the water of condensation or other fluids, substantially as will be hereinafter described, and particularly pointed out in the claims.

Figure 1 is a longitudinal vertical section, with the kettle partly in elevation, of a culinary steamer containing my invention; and Fig. 2 is a bottom view of one of the vessels to more clearly show the securing or holding devices for the drip-pan. Fig. 3, on a larger scale, shows part of the bottom before the seam uniting it to the body of the vessel is completed; and Fig. 4 shows one of the pan-holders in perspective.

The kettle or steam-generator A, of any suitable size and construction, may be provided with a lip or plate, $a$, to prevent the water contained therein from running or spilling over the top of the kettle when it is desired to pour the same from the spout $s$.

The kettle has an open top to receive the bottom of the lower one, B, of a nest of vessels, the topmost vessel, C, of which has a cover, $c$, which serves as a cover for the entire nest of vessels, and as said vessels are alike in construction and adaptation a particular description of one will suffice for all.

In the present instance I have shown a kettle, A, and two vessels, B C; but a greater or less number may be used.

The vessel B has a bottom, $b$, provided with holes $b^2$, preferably punched through the same from its under side, so as to leave raised edges $s$ inclined from the bottom inward toward the centers of the holes, as best seen in Fig. 3. The bottom is concaved at its under and convexed at its upper side, is made seamless, and is provided with an annular depression or channel, $b'$, between the holed portion of the bottom and the interior of the vertical wall or casing of the vessel. The upturned or raised edge about the holes $b^2$ greatly assists in preventing water of condensation or juices escaping from meat or other articles contained therein escaping from the vessel through the perforations in its bottom, while the convexed face or upper side of said bottom $b$ causes such water or fluid to run or flow therefrom into the depression or channel $b'$, where it will be contained until its removal is desired.

A drip-pan, D, is suspended immediately below the perforated portion of the bottom $b$ by means of suitable ears or pan-holders, $d$, preferably made from wrought or cast iron or from iron wire, so as to form suitable strong feet, the said pan being of any suitable construction adapted to catch and retain water of condensation which may escape through the holes $b^2$ from the vessel or juice from the article being cooked, the said pan preventing such water or fluid from dropping from one steamer into another or into the kettle.

The pan-holders are open at one side to permit the pan to be readily removed therefrom when the said vessel is lifted from the kettle or from a like vessel under it.

The rims left about the perforations $b^2$ in the bottom are inclined from the level of the bottom inward toward the centers of the perforations, so that as the bottom is to be wiped the said rims may be easily cleaned and will not serve to catch upon the cloth being used.

In Fig. 4 I have shown one of the feet on a larger scale, and it will be noticed that the said foot will be cut away or notched at its front side, as at 3, to present a beveled edge, which will act to direct the edge of the pan D into the pan-holder, such constructions greatly facilitating the quick and easy introduction of the pan.

The bottoms $b$ are seamless, which enables each bottom to readily fit the top of another steamer or kettle steam tight.

The seamless bottom is flanged and burred up, as shown at 5, and within the burr is placed the outwardly-turned lower end of the body of the steamer or vessel, as shown in Fig. 3, when the burr is acted upon and set down over the outwardly-turned flange 6, thus enabling the bottom so attached to be made to enter another vessel or tea-kettle and form a water and steam tight joint.

As is usual in such culinary steamers, handles $a'$ may be provided for each vessel to enable it to be readily handled.

It will be noticed that steam generated in the kettle has free passage to and into the steamers.

The corrugated spout will form the subject-matter of another application.

I do not herein broadly claim the combination of a culinary steamer with a perforated plate and a drip-pan for receiving the water of condensation, &c.; nor do I claim, broadly, a perforated plate for receiving articles to be cooked, the perforations having raised edges.

I claim—

1. A culinary vessel consisting, essentially, of a kettle or steam-generator and one or more superimposed vessels, the bottom of the latter having a convexed upper surface, and being provided with holes $b^2$, having raised or upward-projecting edges 8, the said holes being distributed over the entire bottom with the exception of a strip or portion next the vertical walls of the vessel, said slit or portion having an annular groove adapted to receive and contain any water of condensation or other fluids, substantially as described, and for the purpose specified.

2. A culinary steamer consisting, essentially, of a kettle and one or more superimposed vessels, the vessel contiguous to the kettle being provided with a bottom having holes or perforations in its middle or central portion, and an imperforate drip-pan of less diameter than the perforated bottom, and removably suspended below said perforated bottom to catch any drippings from the vessel through said perforations, and to permit the ready passage of steam from the kettle around and over the drip-pan, so as to enter the vessel through the perforations, all substantially as set forth.

3. In a culinary steamer, a vessel provided with a perforated bottom and supports or holders secured to the under side of the perforated bottom, combined with an imperforate drip-pan removably retained in the supports or holders, so as to be suspended from the perforated bottom, and adapted to catch any drippings from said bottom, while permitting the free passage of steam around and over the drip-pan and through the perforated bottom, substantially as described.

In testimony whereof I have signed my name to this specification in the presence of two subscribing witnesses.

GEORGE F. SEAVEY.

Witnesses:
GEO. W. GREGORY,
B. J. NOYES.